(12) United States Patent
Griggs et al.

(10) Patent No.: US 9,910,128 B2
(45) Date of Patent: Mar. 6, 2018

(54) ACOUSTIC SOURCE LOCALIZATION IN CONFINED SPACES

(71) Applicants: Kathleen Ann Griggs, Vienna, VA (US); Stephen Patrick Griggs, Vienna, VA (US)

(72) Inventors: Kathleen Ann Griggs, Vienna, VA (US); Stephen Patrick Griggs, Vienna, VA (US)

(73) Assignee: DATABUOY CORPORATION, Vienna, VA (US)

( * ) Notice: Subject to any disclaimer, the term of this patent is extended or adjusted under 35 U.S.C. 154(b) by 0 days.

(21) Appl. No.: 14/863,624

(22) Filed: Sep. 24, 2015

(65) Prior Publication Data

US 2017/0123038 A1    May 4, 2017

Related U.S. Application Data

(60) Provisional application No. 62/138,474, filed on Mar. 26, 2015.

(51) Int. Cl.
*G01S 3/808* (2006.01)
*G08B 17/08* (2006.01)
*G08B 29/18* (2006.01)
*G08B 13/16* (2006.01)
*G01S 5/18* (2006.01)

(52) U.S. Cl.
CPC ............ *G01S 3/808* (2013.01); *G01S 5/18* (2013.01); *G08B 13/1672* (2013.01); *G08B 29/188* (2013.01)

(58) Field of Classification Search
CPC ... G08B 13/1672; G08B 29/188; G01S 3/808; G01S 5/18
See application file for complete search history.

(56) References Cited

U.S. PATENT DOCUMENTS

| | | | |
|---|---|---|---|
| 5,930,202 | A | 7/1999 | Duckworth et al. |
| 6,178,141 | B1 | 1/2001 | Duckworth et al. |
| 7,126,877 | B2 | 10/2006 | Bard |
| 7,433,266 | B2 | 10/2008 | Ledeczi et al. |
| 8,005,631 | B2 | 8/2011 | Barger et al. |
| 2008/0267012 | A1 | 10/2008 | Fisher |
| 2013/0211613 | A1 | 8/2013 | Praske et al. |

(Continued)

OTHER PUBLICATIONS

R. Maher, Acoustical Characterization of Gunshots, SAFE, Apr. 2007.

(Continued)

*Primary Examiner* — Daniel Pihulic
(74) *Attorney, Agent, or Firm* — David Grossman

(57) ABSTRACT

The source of an acoustic even is located. Spatial boundaries for a location are determined. Sensing nodes are placed at the location. The intersection between a sensor area for sensing nodes and spatial boundaries is found. Sensor group(s) of sensing node(s) are determined, based at least in part, on sensing node range limits and shared sensing areas. Solution(s) are generated by processing acoustic event detections based on a multi-sensor fusion of sensor group(s). Solution(s) are refined employing sensor contributions based on a strength of solution compliance value with the spatial boundaries and advancing optimal solutions. Solution(s) are routed to a hub for integration with other services.

22 Claims, 13 Drawing Sheets

(56) References Cited

U.S. PATENT DOCUMENTS

2014/0269199 A1  9/2014  Weldon et al.
2017/0123038 A1* 5/2017  Griggs .............. G08B 13/1672

OTHER PUBLICATIONS

Danicki, E., The shock wave-based acoustic sniper localization, Elsevier, 2005.

Mays, B., Shockwave and Muzzle Blast Classification Via Joint Time Frequency and Wavelet Analysis, Army Research Lab, Sep. 2001.

Boggs, J., Geolocation of an Audio Source in a Multipath Environment Using Time-Of-Arrival, Thesis, Air Force Institute of Technology, AFIT/GCS/ENG/04-03.

Ledeczi, A., et al., Countersniper system for urban warfare, ACM Transactions on Sensor Networks, Nov. 2005.

Simon, et al., Sensor Network-Based Countersniper System, Sensys, Nov. 2004.

Volgyesi, P., et al., Shooter Localization and Weapon Classification with Soldier-Wearable Networked Sensors, MobiSys, Jun. 2007.

Sallai, J., et al., Acoustic Shooter Localization with a Minimal Number of Single-Channel Wireless Sensor Nodes, Sensys, Nov. 2011.

Raytheon BBN Technologies, Boomerang website: www.boomerang.bbn.com.

Qinetiq North America, Ears Gunfire Detection website: www.qinetiq-na.com/products/survivability/ears/.

http://www.shotspotter.com/system/content-uploads/ShotSpotter-Flex-Datasheet.pdf.

Whitman, G., Flow patterns of a supersonic projectile, Common Pure Appl. Math. 5, (1952).

Mays, B., Pham, T., Wavelet based Shockwave Muzzle Blast Discriminator, 17th International Congress on Acoustics, 2001.

Gaunaurd, G., Pham, T., Estimation of the Shock Wave Parameters of Projectiles via Wigner-type Time-Frequency Signal Analysis, 17th International Congress on Acoustics, 2001.

Jeon, I., et al., Noise Source Identification Using the Inverse Frequency Response Function, 17th International Congress on Acoustics, 2001.

Calvert, J., "Sound Waves", http://www.du.edu/~jcalvert/waves/soundwav.htm, Sep. 2003.

Duckworth, G., et al., Acoustic Counter-Sniper System, SPIE Proceedings 2938, Nov. 1996.

Shen, G., et al., Performance Comparison of TOA and TDOA Based Location Estimation Algorithms in LOS Environment, Proc. WPNC'08.

G. Vakulya, G. Simon, "Efficient Sensor Network Based Acoustic Localization", in Proc. 2011 IEEE International Instrumentation and Measurement Technology Conference, Hangzhou, China, May 10-12, 2011, pp. 582-586.

Rasmussen, Per, Greg Flamme, Michael Stewart, Deanna Meinke, and James Lankford. "Measuring recreational firearm noise." Sound and Vibration 43, No. 8 (2009): 14.

* cited by examiner

Table 1 – TDOA (ms) in Cooperative Cluster

|  | 301 | 302 | 303 | 304 |
|---|---|---|---|---|
| 301 | 0 | -30.0011 | 24.803 | 112.938 |
| 302 | 30.011 | 0 | 54.814 | 142.949 |
| 303 | -24.803 | -54.814 | 0 | 88.125 |
| 304 | -112.938 | -142.949 | -88.135 | 0 |

FIG. 12A

Table 2 – Velocity (m/s) in Cooperative Cluster

|  | 301 | 302 | 303 | 304 |
|---|---|---|---|---|
| 301 | 0 | -811 | 2951 | 920 |
| 302 | -811 | 0 | 891 | 556 |
| 303 | 2951 | 891 | 0 | 348 |
| 304 | 920 | 556 | 348 | 0 |

FIG. 12B

ACOUSTIC SOURCE LOCALIZATION IN CONFINED SPACES

CROSS-REFERENCE TO RELATED APPLICATIONS

This application claims the benefit of U.S. Provisional Application No. 62/138,474, filed Mar. 26, 2015, entitled "Acoustic Source Localization in Confined Spaces," which is hereby incorporated by reference in its entirety.

BRIEF DESCRIPTION OF THE SEVERAL VIEWS OF THE DRAWINGS

FIG. 12A is a table of time difference of example arrival values for a cooperative cluster.

FIG. 12B is a table of example velocities of for a cooperative cluster.

DETAILED DESCRIPTION OF EMBODIMENTS

Figure 1:
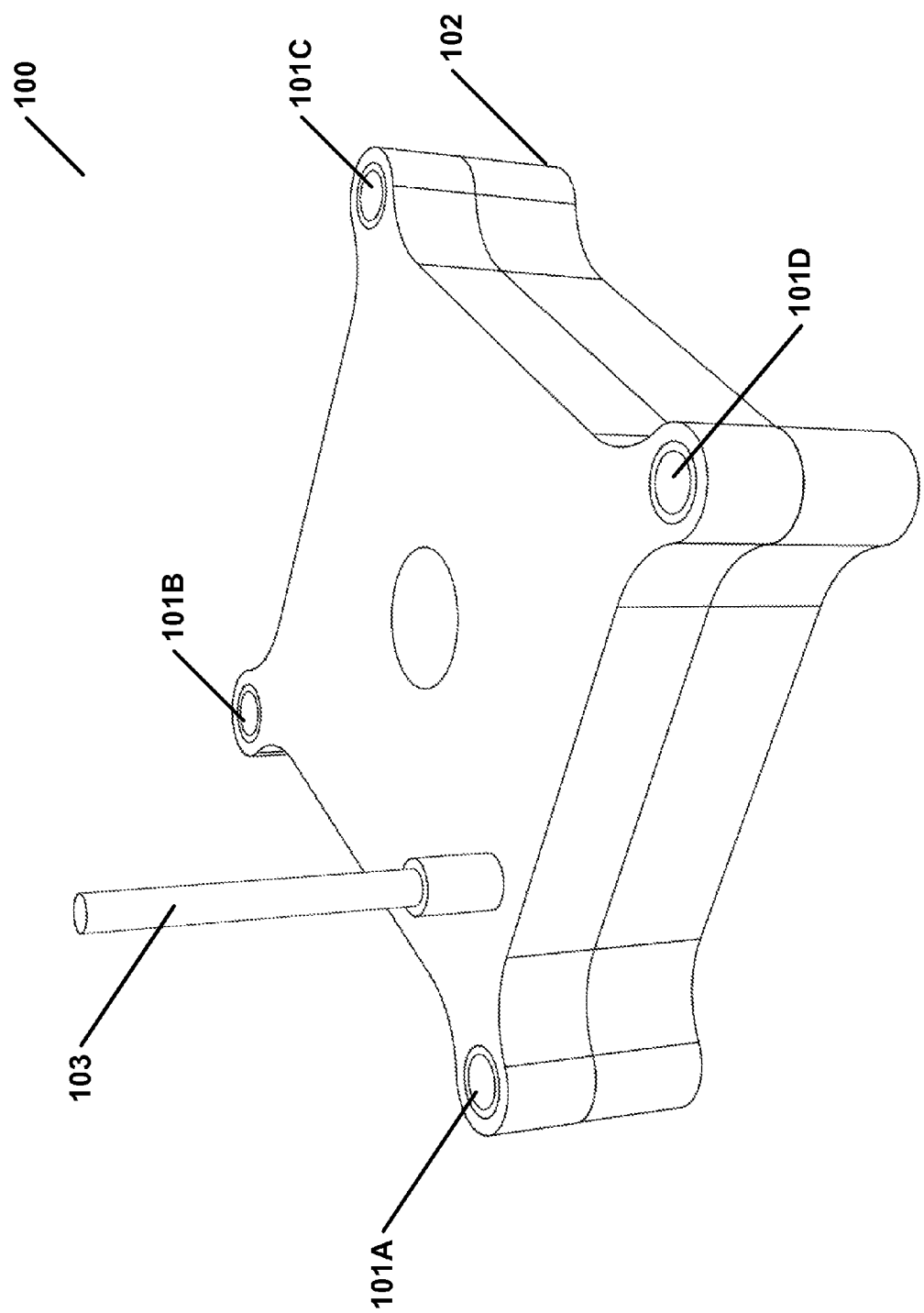
FIG. 1 is a diagram of an example Sensor node according to aspects of some of the various embodiments.

Embodiments of the present invention relate to the localization of acoustic sources. This localization may apply to, for example, the localization of gunshots, explosives or other impulsive acoustic signals.

Embodiments of the present invention locate acoustic sources from events that occur in defined spaces. One or more sensor nodes may be located within a confined area bounded by a physical structure or territorial boundary that also defines the set of possible source locations of the acoustic event. Source location detection incorporates the spatial boundary information with pre-determined sensor positions. Some of the various embodiments comprise command and control features wherein each sensor is inherently registered with an acute space-time context. Command and control features may manage sensor contributions to the detection and localization of a simultaneous event. A base station may: receive information from sensors; manage sensor groups and process solutions. Some of the various embodiments may comprise command and control features associated with surveying the sensor positions and their spatial environment, providing event triggers that actuate other devices or systems, and communications and messaging.

Acoustic localization as discussed herein relates to the problem of gunshot detection and localization. Acoustic events such as gunshots may be characterized by bullet muzzle blast and shockwave with relation to caliber, weapon type, and other factors. Time difference of arrival may be analyzed to localize these acoustic sources. Techniques to perform localization may comprise time synchronization, signal classification, methods for filtering out erroneous data, and communicating with other elements of a system that supports extended functionality such as a camera.

Some acoustic gunshot localization systems measure the muzzle blast or the shockwave of the bullet, or both. A muzzle blast is an explosive shock wave caused by a bullet being ejected from the barrel of a weapon. The muzzle blast may be emitted from the weapon and propagate in multiple directions; however, the energy of the muzzle blast may be significantly reduced in the opposite direction from where the bullet is fired. If a bullet is supersonic, the bullet may produce a shockwave that propagates away from the projectile at the speed of sound perpendicularly to the direction of travel. The bullet shockwave may have a characteristic "N-Wave" form with a rapid time interval (e.g. 200 μs) and the wave shape may be dependent on the caliber of the projectile. A subsonic bullet, such as produced by many handguns, may not form a bullet shockwave but only produce a muzzle blast. The muzzle blast signal may have a longer time interval (e.g. 2-3 ms) and may be difficult to distinguish from other concussive sounds.

Single node systems in multi-path environments may have some performance issues. A portion of existing acoustic gunshot detection systems use a single sensor with an array of microphones designed for self-protection. Some single node systems may determine time difference of arrival of the shockwave signal captured at the microphones on the sensor to determine the direction of travel of the projectile and therefore locate the direction of the source. Distance to the acoustic source may be estimated by locating muzzle blast using a process that looks for the highest energy signal that occurs sometime after the shockwave is found. Some single node systems may contain an array of microphones and employ a neural network to analyze captured acoustic signals from an acoustic event to determine if the acoustic event may be classified as a gunshot. The neural network may comprise, for example, hardware configured as a neural network, and/or hardware in combination with software. If the acoustic event is classified as a gunshot, a further analysis may be employed to look for the direction of arrival of the gunshot and use a camera to capture an image. In closed spaces or high multipath environments, there may be a possibility of reflections that can confuse the sensor as to the actual direction of the source. Highly energetic signals such as a bullet shockwave passing in close proximity to the sensor or a standing wave created by a shockwave propagating in an enclosed space may overwhelm the acoustic microphone making it difficult to detect the entire signal. The possibility for a muzzle blast signal reaching the microphone at the same time as a bullet shockwave signal or a reflected shockwave signal may cause a mixing of signals making it difficult to separate a shockwave from the muzzle blast signal.

Multi-sensor area systems may employ multiple sensor nodes placed around an area that allow for multiple simultaneous detections that may be synchronized to determine the source of an acoustic event (e.g. a shooter location). Area systems may capture acoustic detections from an array of sensor nodes emplaced in different positions. For example, multiple nodes spaced apart may be employed to detect bullet shockwave and muzzle blast signatures. The trajectory of the bullet may be determined by using information on the arrival times of a bullet shockwave detected at the various nodes and solving a ballistics model. Information obtained from the muzzle blast signal may be employed to estimate the range to the acoustic event (e.g. shooter). Acoustic sensor nodes spaced apart may be employed to detect an event wherein at least three sensor nodes are configured and a common clock is employed to determine the absolute time-of-arrival at each of the sensors. This information may be employed to triangulate on the location of the source of the acoustic event. The acoustic signal may be communicated to a human reviewer for verification that it was indeed a gunshot.

A plurality of spatially separated sensor nodes may be employed to obtain multiple detections of the same acoustic event. Sensor fusion mechanisms may be employed to identify possible source locations based on a mechanism that favors results from multiple reporting nodes that are most consistent. This process may, for example, employ a sliding time window and count the maximum number of shot time estimates that are calculated to be in that window. A viable solution may exist in the window with the maximum count. This mechanism may reduce multipath effects in urban areas when: the direct line-of-sight (LOS) signal is the highest energy signal; the multiple signals do not overlap; and there is unambiguous time separation between direct LOS detections and reflected detections.

Indoor shot detection systems may be employed to detect acoustic events that occur in indoor locations. These systems may be, in some cases, designed to be lower cost than the wide area systems and/or military systems. Gunshots may be detected using a simple assumption that a gunshot has significantly higher signal strength (sound pressure level) in comparison to background noise and has rapid signal rise time. Indoor detection systems based on individual nodes may be confined to a room or area and employ location information from where the sensor is within a building floor plan to identify a shot location. An audio signal may be communicated to human reviewers to reduce the possibility of error. Optical sensors (e.g. one or more) may be employed in addition to microphones in order to optically verify the presence of a muzzle blast and reduce the false detection rate. Optical sensors may introduce false detections. These systems may or may not employ sensor fusion to remove ambiguities.

False alarms may occur when there remains some ambiguity between a shot signal and other concussive sounds. Another reason for false alarms is that the strength of an acoustic signal may be dependent on the square of the distance to the acoustic source. For example, a pistol fired ten or more meters from the sensor may have similar characteristics to other impulsive sounds like a locker slamming in close proximity to sensor.

Efforts to reduce false alarm rates that employ additional means of verification that a gunshot occurred either with the use of orthogonal sensor inputs or human reviewers may be costly. If the means of verification is a human reviewer, then as the number of installations may grow, the requirement for reviewers may increase. Use of an optical sensor that looks for muzzle flash to verify that a shot was detected may increase overall reliability, but, in certain circumstances, such as non-LOS conditions or when a flash suppressor is utilized, they may not detect the flash and conditions such as bright sunlight may introduce false alarms, therefore these sensors may not be expected eliminate false alarms. Due to the nature of the threat and the cost of responding to false alarms, users of a gunshot detection system may have a low tolerance for false detections and therefore may look for additional solutions for verifying shot reports.

Indoor environments may challenge single node systems. Some systems designed for indoor environments employing single sensors in an area such as a classroom may employ a common assumption that the gunshot signal is characterized by the presence of strong acoustic signal with rapid rise time. This assumption, by itself, may suffer from false alarms, missed detections, errors caused by multipath, and imprecise localization. A single node may miss detections due to failure to detect gunshots that are too distant to meet the threshold or are fired too close to the sensor and thus causing the microphones to saturate. A single node may mistake a concussive sound in very close proximity to the sensor as a shot detection or confuse a bounced signal as a shot detection, or be unable to separate signals that are mixed with reverberations. Walls, ceilings and other features in interior environments cause sound to be echoed and also give rise to reverberations inside the enclosure resulting in mixed signals that are ambiguous. Localizing the source of individual shots may be limited to the room the sensor is installed. For practical purposes, a single sensor may not provide enough location information in areas with multiple access points like a cafeteria or atrium.

Multi-sensor systems that combine detections from a plurality of sensors may overcome false alarms and problems that cause missed detections and errors caused by multi-path and reverberations. Multi-sensor systems may compute location based energy peaks and implement search windows that mitigate false alarms and reject multipath signals. A plurality of sensors may be employed to determine accurate location and provide trajectory and caliber information that further confirm the presence of a shot. These systems have been proven in outdoor environments but the employment of these systems indoors may benefit from enhancements as described herein. Multi-sensor systems that rely on discrimination of individual acoustic events may be complicated in severe echo conditions wherein shockwave and muzzle blast signatures overlay. Some systems may require clear LOS to the acoustic source from multiple sensors that are distributed across a wide area outdoors. Indoors, the sensors in some systems may likely be in linear arrays with very few having common LOS to the source. These systems may operate under the assumption that the signal propagates uniformly across multiple sensors. This assumption may cause difficulties in interior spaces that are characterized by surfaces that range from absorbent to reverberant, where the signal may vary widely across the array of locations, such as being mixed at one sensor and not mixed at another. Finally, the fusion process may require accurate position and heading information for sensor nodes. This may be complicated indoors where GPS is not available.

Embodiments of the present invention addresses deficiencies with prior methods of acoustic localization in confined spaces. Some of the various embodiments may sense and locate the source of an acoustic event utilizing awareness of a sensor's spatial surroundings to limit the localization task. Some of the various embodiments may employ permissible sensing areas and decompose the problem of signal detection and localization into multiple steps while applying constraints. One of the various factors comprises defining areas where each individual sensor can generate an acoustic source measurement with an open line of sight. Another factor comprises defining the amount that various individual sensor measurements may contribute towards a fused solution within a defined set of spatial constraints. Another factor comprises defining lists of spatial areas and their associated sets of constraints.

Some of the various embodiments may manage the placement of sensor node(s) to increase their contribution to performance. Geometric sensor areas may be located that limit the range at for which individual sensor node(s) may measure a signal and wherein cooperative sensing parameters for multiple sensors may be defined throughout an area, and a common frame may be determined with regard to how various sensor(s) contribute towards a solution. A geometric area, such as a 2D or 3D box, circle, sphere, and/or the like may be determined surrounding the node position. The geometric area may have deducted sectors with obstructed line-of-sight or that extend beyond other imposed spatial constraints. According to some of the various embodiments, cooperative sensing parameters may be determined as relating to the number of other sensor nodes that share sensing areas. Node placement may be determined to increase shared sensing areas and area coverage to reduce ambiguity. Solution results in qualified sensing areas may determine how information from designated sensing nodes are permitted to contribute to an overall solution.

Some of the various embodiments may be manifested as a gunshot detection and/or bullet tracking system configured for use inside of buildings and/or to cover limited outside areas such as, but not limited to: parking lots, campuses, firing ranges, compounds, combinations thereof, and/or the like. Some embodiments may be linked to other security and notification infrastructure such as, but not limited to: an integrated security system, a video management system, a cloud-based subscriber notification system, combinations thereof, and/or the like.

We now discuss locating the sensing areas in confined spaces. The geometric sensing area for each individual node may be determined by utilizing, at least in part, a map, a floor plan, other geo-referenced feature boundary data, combinations thereof, and/or the like. This location data may be used for indoor areas, areas confined by physical walls or structures, combinations thereof, and/or the like. The position of a node may be located by, for example, using GPS and/or measuring the position of the node relative to the floor plan or map. A relative reference frame may be employed if the floor plan and/or map are a digital file. In the case of a digital file, the scale may be established in the software file. The position of the sensor may be entered into the digital file. The sensor node's radial FOV up to a maximum distance may be specified. The areas where there are walls, obstructions, and/or other features that limit line-of-sight may be determined in the digital file. The sensor node's area may be compared with the areas of the floor plan that are obstructed from direct line-of-sight from the sensor node. The obstructed areas may be deducted from sensor FOV creating the node's sensing areas.

We now discuss defining cooperative sensing parameters. For each node, a list of neighboring nodes may be determined as a set of nodes that are within the maximum distance from that node. This list of neighboring nodes may be determined at the set up. Up to a maximum number of nodes that are specified may be included in a neighborhood. The sensing areas from neighboring nodes may be compared and the areas where there is an intersection of more than one neighbor listed. Multi-sensor fusion may require a minimum number of participating nodes. Therefore, sensing areas where there is an intersection with the minimum number of nodes required for fusion may be determined. The minimum number could be, for example, two nodes reporting for localization or three or more nodes reporting for trajectory information. One example may be the case of a straight corridor inside of a building. In this example, the sensors may have LOS in two directions and the possible source location may be restricted to a line. With the Time Difference of Arrival (TDOA) localization technique that is performed when the sensors are at known positions and the acoustic emitter is at an unknown position requires, three sensors may be needed to locate the source in two dimensions (x,y). If there is uncertainty in the system, then a fourth sensor may be required to resolve the error in the position. In the narrow corridor example where the source exists only along one line and the error is expected to be very small, then only two sensors may be required to locate the source. An embodiment of this invention may classify areas and number of sensors that can unambiguously determine the location of the source and designate those sensors as a contributing cluster. When an event occurs, a search window may look for the presence of detections from the minimum number of sensors in the cluster.

With regard to determining sensor placement. The placement of nodes may determine the amount of sensing area coverage and shared sensing areas. Sensors may be placed to take advantage of the desired sensing area while limiting the number of required sensor nodes.

Cooperative clusters may be determined. Nodes in the same neighborhood that share sensing areas may form a cooperative cluster. When an acoustic event takes place, each node that is exposed to the resulting signal and makes detections may send a report across a network. Detection reports may be accumulated at a central node or gateway and linked to reports from other nodes in the cooperative cluster. Cooperative clusters may determine the contribution from each sensor in the fusion process. Fusion mechanisms may be employed to estimate the location of the source and other information such as trajectory from the reporting sensors in the cluster. Changing accepted contributions from each node in the cluster may change (or refine) the fused solution.

Some of the various embodiments sense and locate an acoustic source utilizing awareness of a multitude of sensor's spatial surroundings to limit the localization task. Multiple acoustic sensing nodes may be employed to detect impulsive acoustic events. Detected acoustic waves may be analyzed to determine whether the source of the events was a gunshot and collaborate to produce a fused solution determining the location of the impulsive acoustic events (e.g. the location of a shooter).

FIG. 1 is a diagram of an example sensor node 100 according to aspects of some of the various embodiments. Multi-channel acoustic sensing nodes 100 may be employed. For example, as illustrated in FIG. 1, four (4) microphones (e.g. 101A, 101B, 101C and 100D) separated by a minimum distance of 10 cm may be employed in acoustic sensing node 100. A sensor housing 102 may contain elements to detect and process acoustic detections at the microphones (e.g. 101A, 101B, 101C and 100D). According to some of the various embodiments, the housing 102 may comprise an antenna 103 configured for wireless communications. According to some of the various embodiments, the housing 102 may comprise an optical sensor 104 configured to detect, among other things, explosive events.

Figure 2:
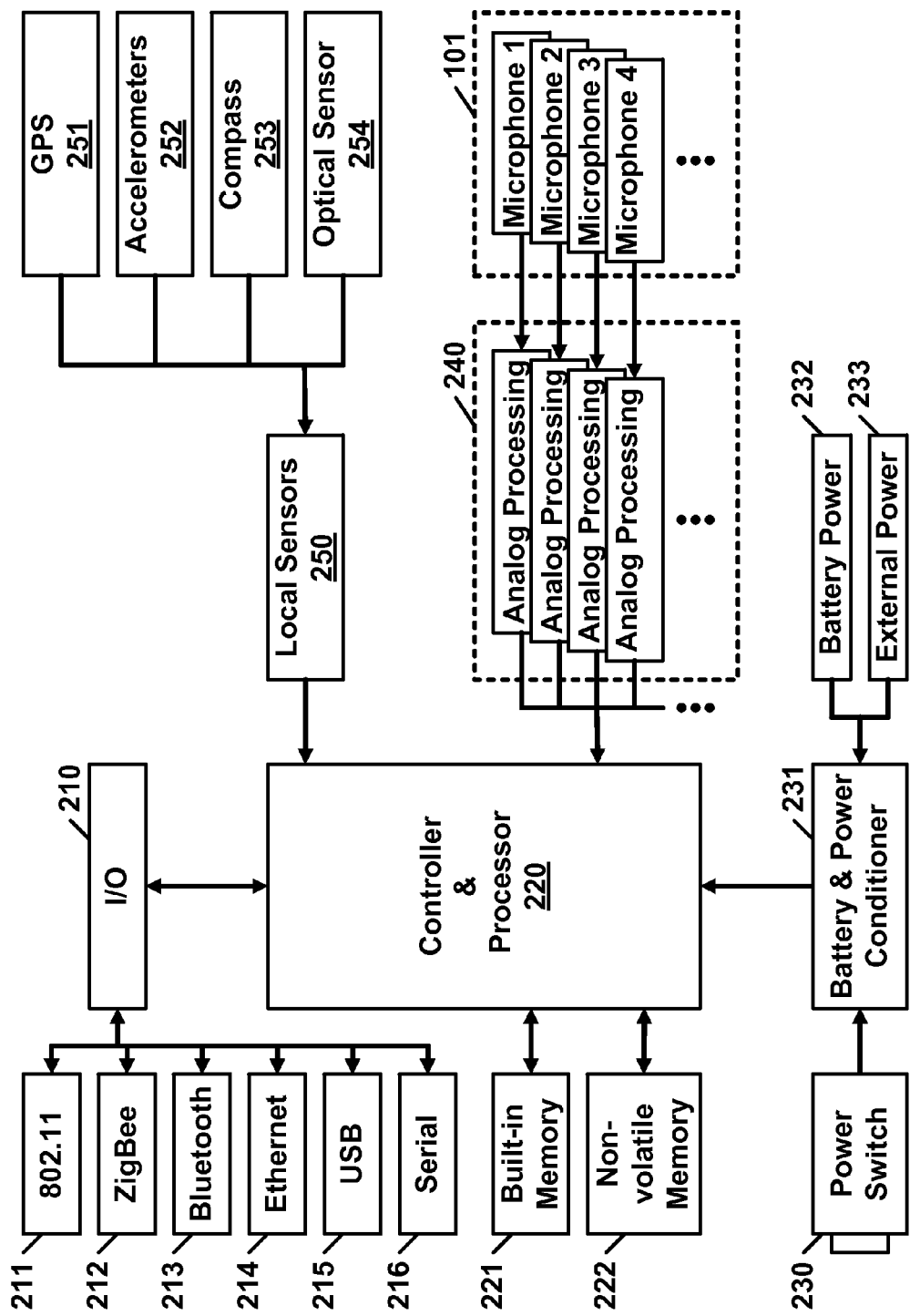
FIG. 2 is an example block diagram showing components of a sensor node according to aspects of some of the various embodiments.

FIG. 2 is an example block diagram showing components of a sensor node according to aspects of some of the various embodiments. Acoustic sensor node(s) 100 include many components that may enable sensor node(s) 100 to be configured for a range of applications. The acoustic environment may be continuously monitored by the microphone array (e.g. 101A, 101B, 101C and 101C) and processed via analog channel(s) 240 and a processor 220. Audio processors may collect the incoming signal in memory 221, and the signal from the microphone(s) (e.g. 101A, 101B, 101C and 101C) may be processed to measure features such as, for example, rise time and amplitude, compared against background noise for indications that the acoustic waves may be shockwave or muzzle blast signals. Measurements from the microphone(s) (e.g. 101A, 101B, 101C and 101C) may be further compared to determine direction-of-arrival relative to the sensor node(s) (e.g. 100) orientation and length of the signal. Detections from an optical sensor 254 may be processed and/or employed to further verify if a gunshot event occurred.

Figure 4:
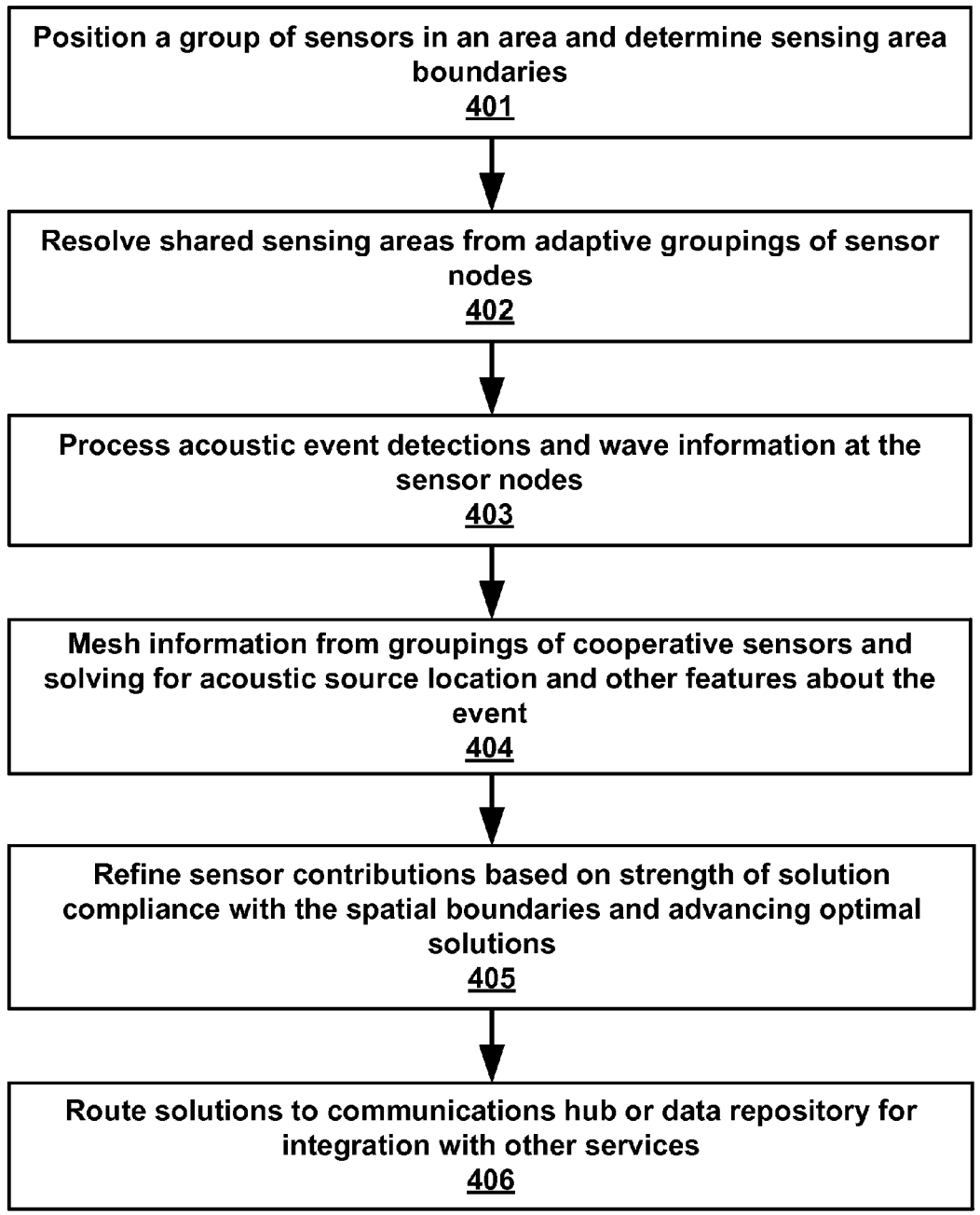
FIG. 4 is an example flow diagram showing a process of spatial limiting of sensor input according to aspects of some of the various embodiments.

Multi-source fusion mechanisms may be employed. For example, when characteristic waves are detected, nodes may output data 210 to a central host configured to execute a sensor fusion process to combine detections from multiple nodes. Measurements from participating nodes may be communicated through one or more of available communications channel 211, 212, 213, 214, 215, or 216, provided that the relative time information among the cluster of nodes is adequately preserved. A process may be executed wherein acoustic wave measurements from multiple sensors are used to locate the source and estimate the trajectory of a supersonic projectile. An example process wherein the fusion process is bounded by a set of constraints derived from the surrounding spatial environment is described in the example flow chart shown in FIG. 4.

Aspects of embodiments of the present invention may be employed to locate sensors. Limiting the fusion process with constraints derived from spatial surroundings 400 may comprise locating sensor positions and orientations in a reference frame relative to a node cluster and a coordinate system that may be used to collaborate with other nodes and share results with outside subscribers. In one example embodiment, each node position may be measured with, for example, an on board GPS 251 and its orientation and heading measured via accelerometers 252 and compass module 253. This information may be stored in a geocoded map. Manual input may be employed for locating sensor positions in the absence of GPS and the orientation and heading sensor suite. The sensor node's radial Field-of-View (FOV) up to a maximum distance may be specified. The maximum distance may correspond to a maximum range from where a gunshot will produce a detectable signal. Alternatively, an arbitrary cutoff distance may be employed.

Figure 3:
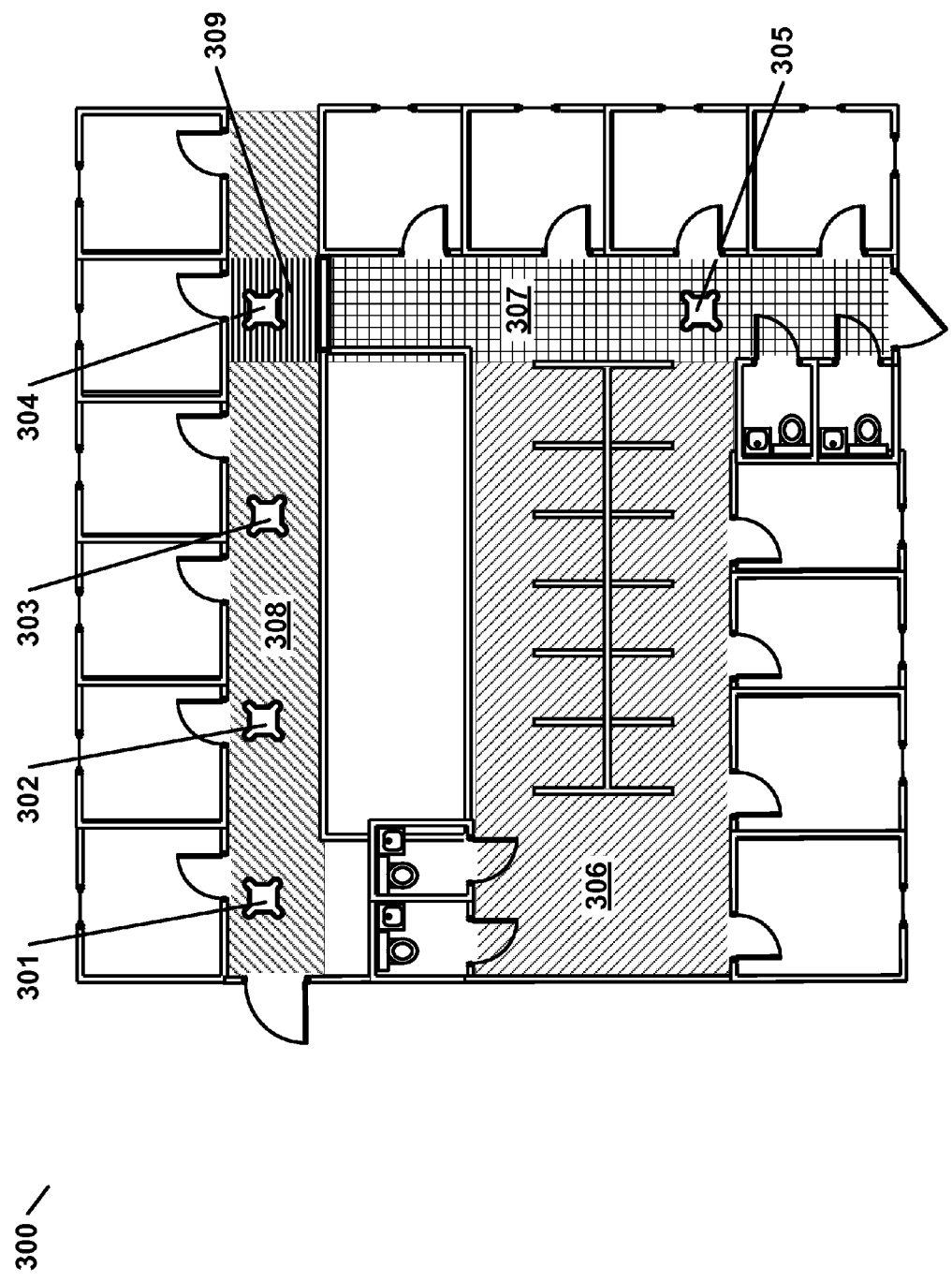
FIG. 3 is an example schematic illustration of sensors located in an indoor environment with special limits according to aspects of some of the various embodiments.

Locating sensing areas may comprise determining the sensing area boundaries for each node. Sensors may be placed in an area and the sensor's spatial surroundings entered on a common vector map at 401. The geometric sensing area for each individual node may be determined by utilizing a map or floor plan as the input (See FIG. 3). This technique may be employed for indoor areas or areas confined by physical walls and/or structures. The sensor node's maximum FOV may be specified. The position of each node (e.g. 301, 302, 303, 304, and 305) may be located relative to the floor plan or map (e.g. 300). The position may be entered as, for example, as an x, y, z coordinate in a relative reference frame where, if the floor plan or map is a digital file, the scale is established in the software file. The areas where there are walls, obstructions, and/or other features that limit line-of-sight (LOS) up to that maximum range may be determined in the digital file. The sensor node's entire area may be compared with the areas of the floor plan that are obstructed from direct line-of-sight from the sensor node. The obstructed areas may be deducted from sensor FOV creating permitted sensing areas. From the perspective of implementation, if the sensor position is (x, y), and it's sensing area up to a maximum LOS is within an enclosed space, the sensor's sensing area may be restricted by $R=\{(x,y)|-a \leq x, y \leq a\}$. In the example shown in FIG. 3, the sensing area for node 301 may be determined to be shaded area 308. Shaded area 308 comprises shaded area 309. Similarly, the sensing area for node 304 may comprise the union of shaded areas 308 and 307, and the sensing area for node 305 may comprise the union of shaded areas 306 and 307. Another example process for locating sensing areas may employ, for example, a sighting tool such as a laser rangefinder to create a relative of obstructive feature positions.

Sensing areas shared by the intersection of two or more nodes may be resolved at 402. The determination of the intersection of shared sensing areas may be performed from the set of neighboring nodes. A multi-source fusion algorithm may require a minimum number of sensors with shared LOS to the source. The minimum number could be two nodes reporting for localization and/or three or more nodes reporting for trajectory information. Shared sensing areas (e.g. 309) may represent areas wherein the fusion process may comprise good coverage and will most accurately resolve the position of the shooter when the fusion process takes place at 403. Optimizing shared sensing may be performed through an iterative optimization process. The placement of nodes may be managed to achieve a high level of shared sensor coverage. An optimal deployment goal may maximize shared space and minimize the required number of sensor nodes.

According to some of the various embodiments, nodes that share sensing areas may form a cooperative cluster at 404. When an acoustic event takes place, each node exposed to the resulting signal may make detections and send a report across the cluster. Detection reports may be accumulated at a central node. The reports may be submitted to a fusion algorithm with weighting applied to groupings from the same cooperative cluster and an estimate of the location of the source and other information such as trajectory may be resolved. In another aspect of one of the various embodiments, the fusion process may be implemented to further refine the solution at 405 by comparing location and trajectory solutions against a set of qualified sensing areas. The fusion process may be adapted with weighting values associated with reports from contributing nodes that are consistent with sensing areas that are in proximity of the estimated location and reduce the allowed contributions for sensors where the estimated location is not part of a sensing area.

Data collected from a live demonstration provides illustrates an embodiment of a computation within a cluster. Using the placement of example nodes in FIG. 3, nodes 301, 302, 303, 304 may be in a shared sensing area that is constrained in a narrow and long hallway. Sensors may be placed in a one-dimensional line (such as sensor nodes 301, 302, 303, 304). The position of the nodes and subsequently, the distance between nodes may be known from the initial placement survey. When a rifle shot is fired in the hall, the sensors may detect a range of signals depending on their location with respect to the source. Sensors to the rear of the rifle may detect the muzzle blast signal and sensors in the front may detect the shockwave coming from the bullet and a muzzle blast signal possibly at the same time. The time of arrival of the acoustic shot signal may be recorded at each of the sensors and the time difference of arrival (TDOA) computed for each sensor pair in the cluster is shown in FIG. 12A. Sensors have known positions on the line; therefore the velocity of the acoustic signal travelling between sensor pairs is directly computed and shown in FIG. 12B. The data shows measurements between sensors 303 and 304 are consistent with the speed of sound indicating a muzzle blast signal. The measurements between 302 and 301 are consistent with a rifle bullet and may represent a bullet shockwave. The other velocity measurements in the cluster too large to be practical indicating they are not measuring the same signal. It may be deduced that a shockwave signal travelled from sensor 302 towards sensor 301 and a muzzle blast only was present travelling from sensor 303 to 304. The likely source location is between sensors 302 and 303 with a supersonic shockwave signal propagating in the direction of 302 (negative direction) and a muzzle blast propagating in the direction of 303 (positive direction). The TDOA from 302 and 303 is found from FIG. 12A to be −54.814 ms, noting the negative value indicates the signal arrived at 303 before arriving at 302. Using the known distance between 303 and 302, and the propagation velocities for the bullet shockwave and muzzle blast signal the location of the source may be found to be 20.83 m from 302 in the direction of 303. This agrees with the sensing area constraint. All sensing clusters that contain measurements are similarly evaluated, however, solutions yielding results that agree with the area constraints receive the highest weighting.

Figure 5:
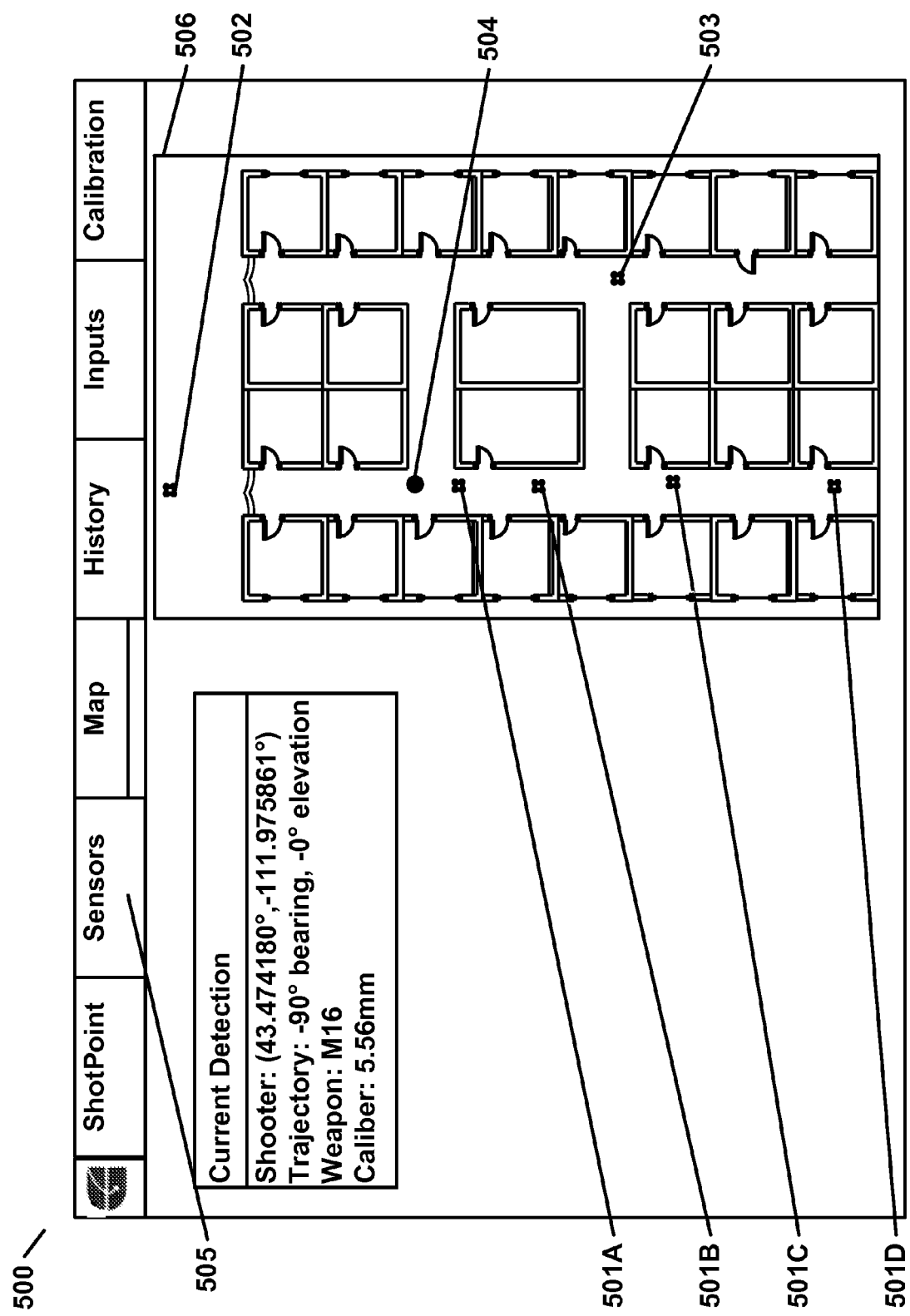
FIG. 5 is an example sensor control screen according to aspects of some of the various embodiments.

According to some of the various embodiments, hub reporting and sensor controls may be employed. A solution from the sensor cluster may be communicated to a hub where it is reported to a data repository or integrated with other services at 406. FIG. 5 is an example sensor control screen according to aspects of some of the various embodiments. As illustrated in example FIG. 5, a software interface to the hub may allow for interactive control of sensor cluster(s). Reporting features illustrated in FIG. 5 show a post-shot scenario and shows sensor nodes that reported a signal detection but were unable to calculate any additional information (nodes 501A, 501B, 501C, and 501D), nodes that were able to measure a muzzle blast signal 502, and a shockwave signal 503, and a computed location within a shared sensing area 504. The controls manage sensor placement and orientation may have been entered via manual input and/or a map as described above. Utility features included in the sensor setup controls 505 may manage individual sensor health and performance parameters. A calibration 506 utility may be configured for users to modify signal characteristics that may be measured and classified as an event. In another aspect of this invention, the remote access reporting and control features may be integrated with other automated systems.

According to some of the various embodiments, acoustic source location reports may be integrated directly into a video surveillance network. This configuration may require a map of camera locations and the area of coverage for each camera. The area covered by the acoustic sensor network may be linked to the camera coverage map. When an acoustic source is located, a report may be submitted with that identifies the camera(s) that have the specific location within their coverage. This report may be employed to cue the camera(s) to begin streaming video showing the location of the acoustic source. The report may provide accurate time data to enable synchronization of the video stream to the exact moment the acoustic event took place. This reporting mechanism may employ a broadband or other telecommunications link to create a video streaming cue at a remote location such as a security operations center, an emergency dispatch center, a security services location, or a cloud data sharing location.

According to some of the various embodiments, the I/O port FIG. 2, 210, for at least one sensor nodes may receive one or more types of sensor actuation messages. For example, receipt of a sensor actuation message may cause the sensor to report the presence of an emergency situation at that location. This may be referred to as a panic button message. In another example, receipt of a sensor actuation message may be employed to initiate a validation test of the health and functionality of the sensor node. This may be referred to as a system test message. In another example, receipt of an actuation message may instruct the sensor node to transmit a localization report to the network.

Figure 6:
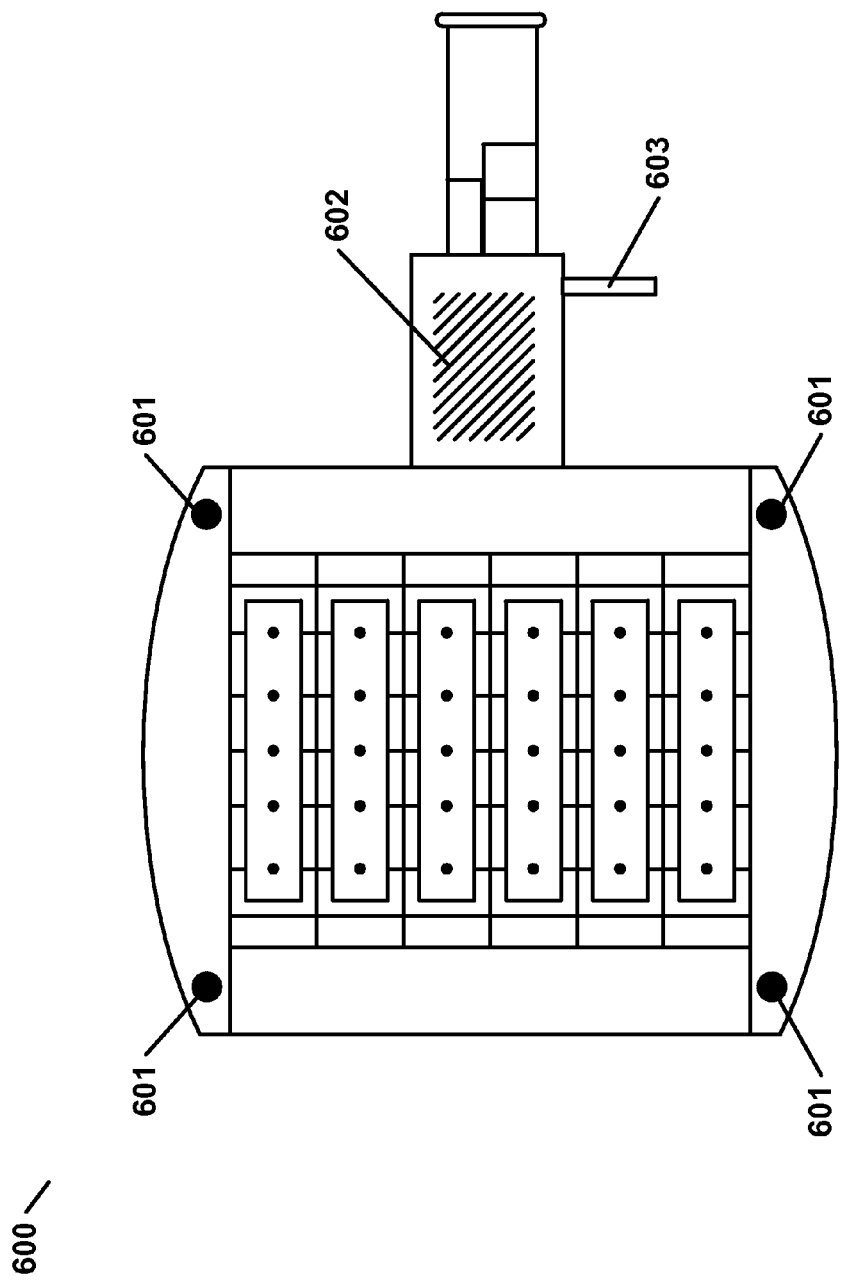
FIG. 6 is an example shot sensor integrated into light according to aspects of some of the various embodiments.

According to some of the various embodiments acoustic sensor node(s) may be integrated into lighting fixture as shown in FIG. 6. This configuration 600 refers to luminaires typically used for commercial lighting applications such as street lighting, parking lot lighting, parking garage lighting, exterior lighting and/or interior commercial spaces such as enclosed malls or shopping centers, and/or the like. This configuration may require the node separate the microphones from the acoustic processor unit. Microphones 601 may be installed into the luminaire casing and the acoustic processor unit 602 housed in the box that normally contains the lighting control electronics. According to some of the various embodiments, a wireless network may be employed (see antenna 603) for sensor network communications.

Figure 7:
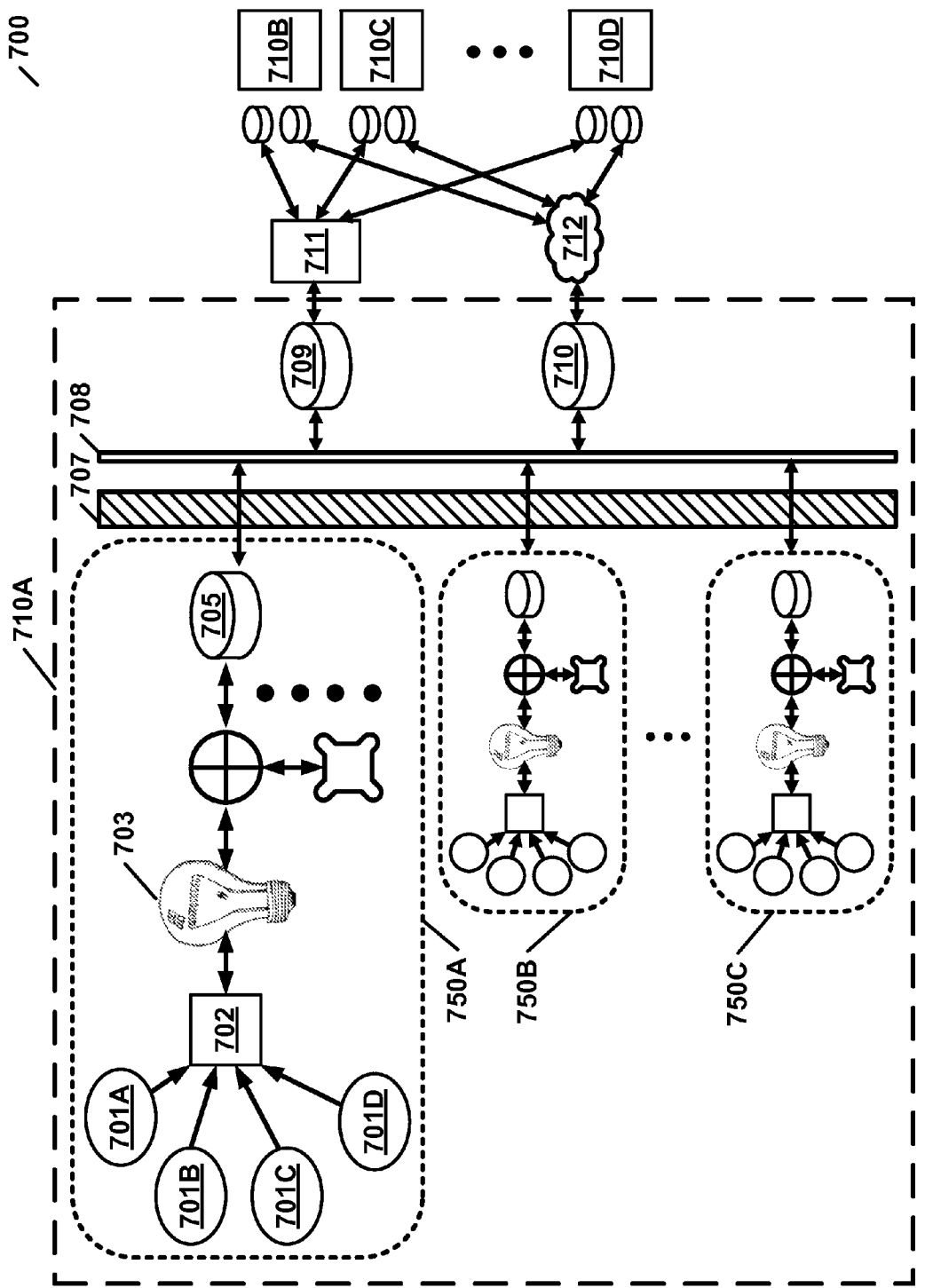
FIG. 7 is an example diagram illustrating shot sensor and lighting control mediation according to aspects of some of the various embodiments.

According to some of the various embodiments, acoustic sensor node management and sensor lighting and control mediation may be employed into cooperative sensor network for or an augmented lighting control network. The sensor network for the acoustic localization system may occupy the same physical medium. In the illustrated example embodiment shown in FIG. 7 the sensor network 700 may comprise a group of multiple integrated sensor and lighting control systems (e.g. 710A, 710B, 710C . . . 710D). Multiple integrated sensor and lighting control systems (e.g. 710A) may comprise integrated sensor and lighting control systems sensor networks such as, for example: 750A, 750B . . . 750C. Sensor networks such as sensor networks (e.g. 710A, 710B, 710C . . . 710D) may occupy a wireless Zigbee medium or other lighting control bus. The lighting control electronics 702 may be configured to manage lighting sensors (701A, 701B, 701C . . . 701D) that comprise sensors configured to, for example, check power levels, ambient lighting levels and/or the presence of pedestrians or vehicles. Luminaire 703 may contain power and lighting actuation switches that provide power to the lamp as well as integrated electronics. The acoustic sensor processor unit 602 may be integrated with the lighting control electronics for the purposes of power management and access to network communications. The lighting control network may be configured to tolerate latency and may have a much different architecture than the acoustic sensor network that may rely on a deterministic link architecture that may only intermittently be used. According to some of the various embodiments, a sensor network changeover module 704 configured to effectively toggle the network parameters between the lighting and the acoustic sensor activities may be employed. The network changeover module may activate middleware layer 707 configured to control network activities of unit(s) in the network. When an acoustic sensor node reports a detection that requires deterministic use of the network, the middleware 707 may command a changeover 705 to the acoustic network at node(s) on the network. After the last communication from the acoustic network has timed out, the lighting control electronics may resume scheduled communications and the middleware 707 may arbitrate scheduling between lighting and acoustic node communications. Multiple sensor networks may be collected at gateways that route message traffic into either a lighting control process 711 or a security alert process 712. The sensing and lighting control system up to the gateway 710A may occupy a portion of the lighting control management or security management system. In a real world implementation such as, but not limited to: an enclosed mall, parking lot, and/or campus, there may be multiple integrated sensor and lighting control systems (e.g. 710A, 710B, 710C . . . 710D) connected into, for example, a single management application.

Figure 8:
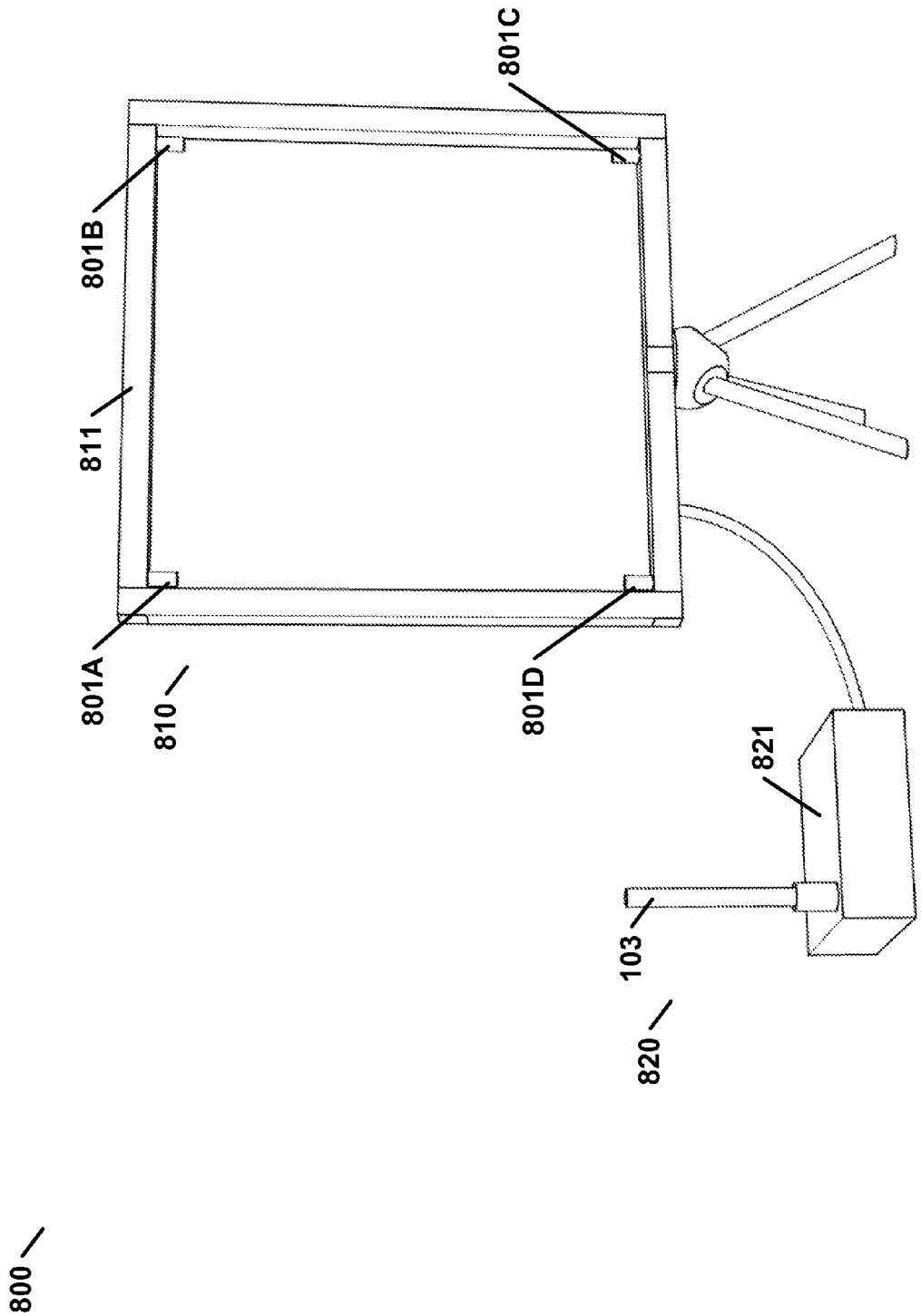
FIG. 8 is an example diagram of a trajectory sensor according to aspects of some of the various embodiments.

According to some of the various embodiments, an acoustic target may be employed. FIG. 8 is an example diagram of a trajectory sensor according to aspects of some of the various embodiments. The acoustic target 800 may comprise an electronic device configured to be utilized at rifle ranges for accurately measuring target impact and communicating to the bench at the firing line, thereby reducing the need for individuals to move down range and retrieve or change targets. In this example embodiment, acoustic channel(s) may process information about bullet shockwave detections and may be employed in combination to determine the location that the bullet intersects the microphone plane. In the example acoustic target, the microphones (801A, 801B, 801C . . . 801D) may be mounted into a frame 811 with a hollow center that may, according to some embodiments, be over a meter in each dimension. The frame may incorporate a mounting apparatus 812 that enables the target apparatus 810 to be placed on a firing line and resilient enough to withstand occasional bullet impact. The acoustic processor unit 820 may be separated from the microphones (801A, 801B, 801C . . . 801D) and housed in a rugged casing 821 that may, for example, be buried or placed behind a berm with and connected to the target sensor apparatus 810 via a cable 822 that extends up to several meters. The acoustic processor unit may communicate to the firing line via, for example, a wireless data link 103.

Figure 9:
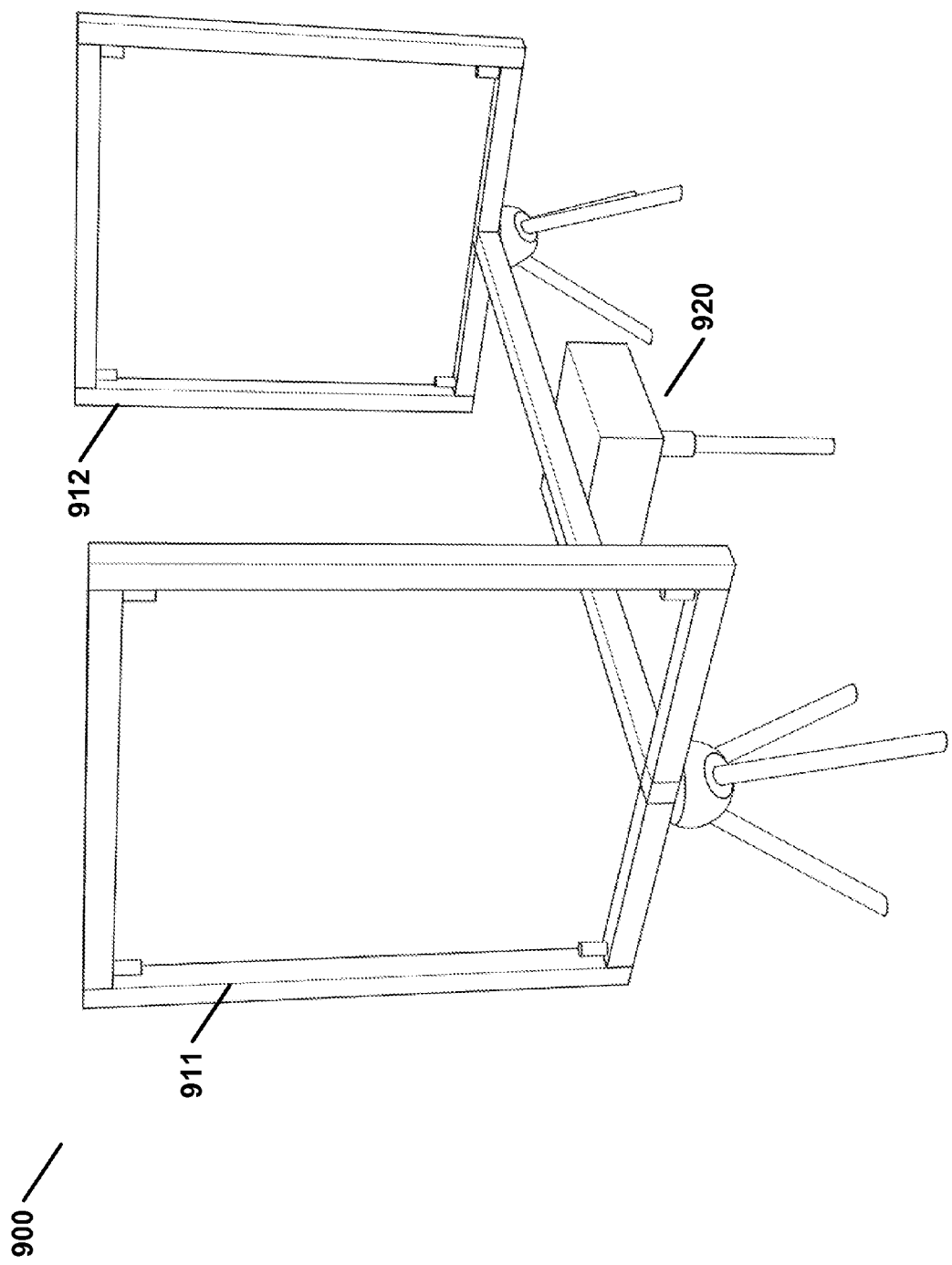
FIG. 9 is an example diagram of a muzzle velocity meter according to aspects of some of the various embodiments.

According to some of the various embodiments, a muzzle velocity meter may be employed. FIG. 9 is an example diagram of a muzzle velocity meter according to aspects of some of the various embodiments. A muzzle velocity meter 900 may comprise an apparatus employed to determine the velocity of a bullet as it leaves a gun on the firing line 900. This embodiment may employ two (or more) electronic target apparatus 911 and 912 as the basis. Electronic target apparatus 911 and 912 may be similar to electronic target apparatus 810. In this embodiment, two acoustic targets 911 and 912 may be employed with a smaller frame dimension (for example, less than 1 meter). The targets 911 and 912 may be separated approximately a meter apart. An acoustic processor unit 920 (similar to acoustic processor 820) may be incorporated into the frame such that the apparatus is a single unit. The bullet may pass through both target frames 911 and 912 so that the exact location and time that the bullet penetrates each frame 911 and 912 is determined. This results in a trajectory and velocity determination.

Figure 10:
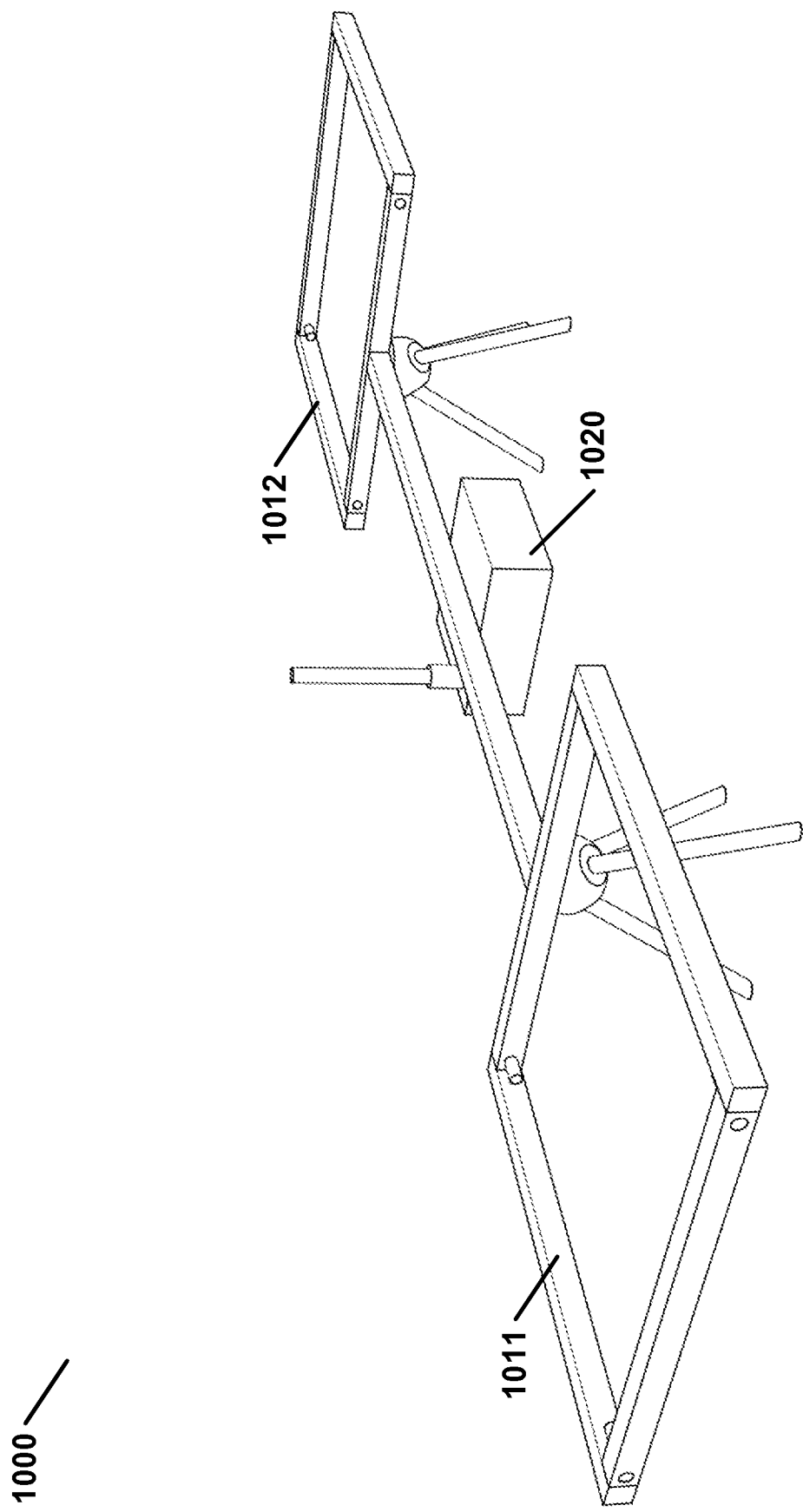
FIG. 10 is an example diagram of a trajectory sensor according to aspects of some of the various embodiments.

According to some of the various embodiments, a trajectory sensor may be employed. FIG. 10 is an example diagram of a trajectory sensor according to aspects of some of the various embodiments. The trajectory sensor 1000 may comprise an apparatus employed to determine a trajectory of a bullet as it passes downrange of a firing line. This embodiment may be similar to the muzzle velocity meter 900 with frames 1011 and 1012 oriented vertically such that the bullet passes above the apparatus. This embodiments may collect and process information employing acoustic processor 1020 to obtain the bullet shockwave and to determine the velocity and path of the bullet.

Figure 11:
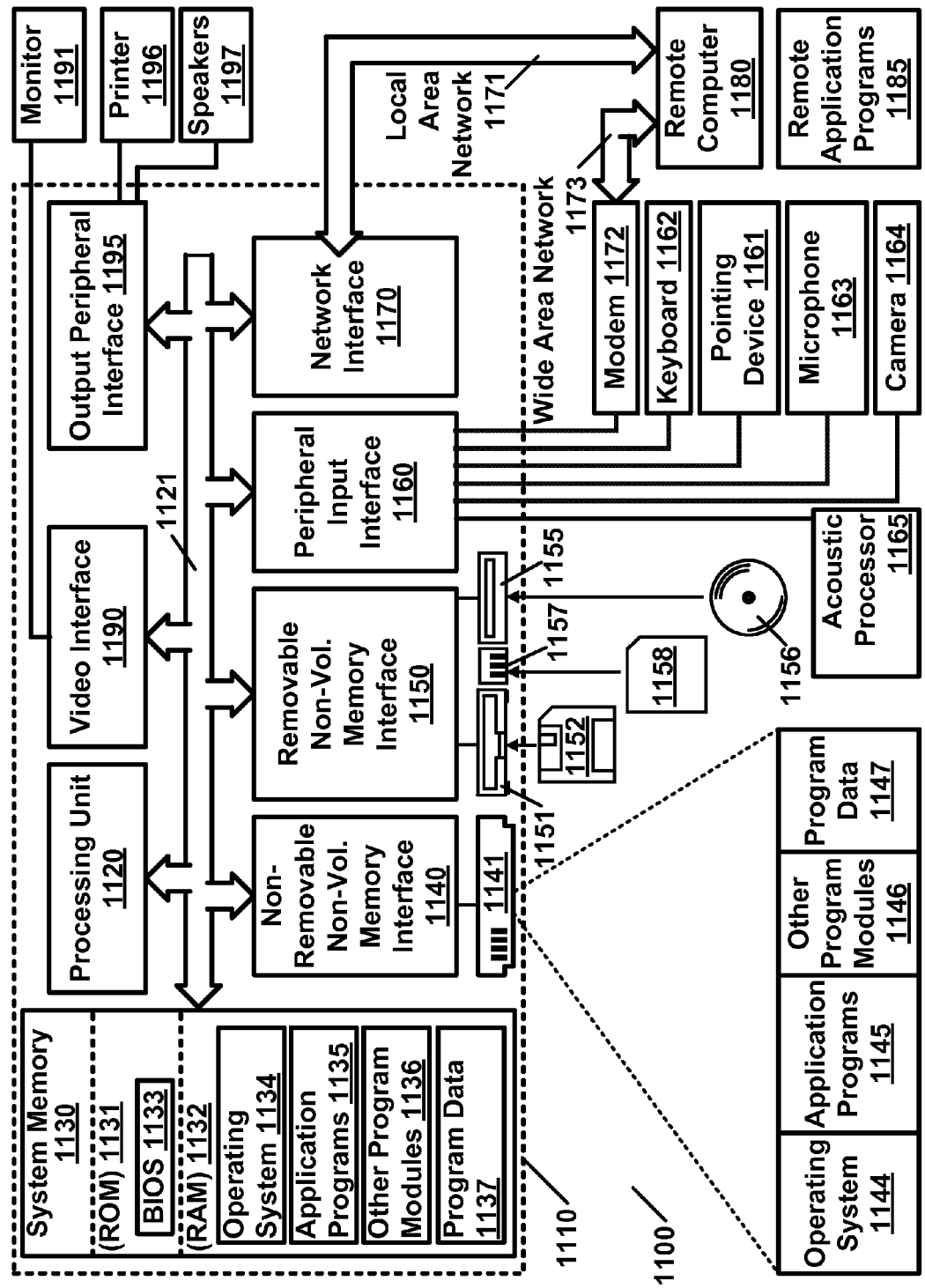
FIG. 11 illustrates an example of a suitable computing system environment on which aspects of some embodiments may be implemented.
Figure 13:
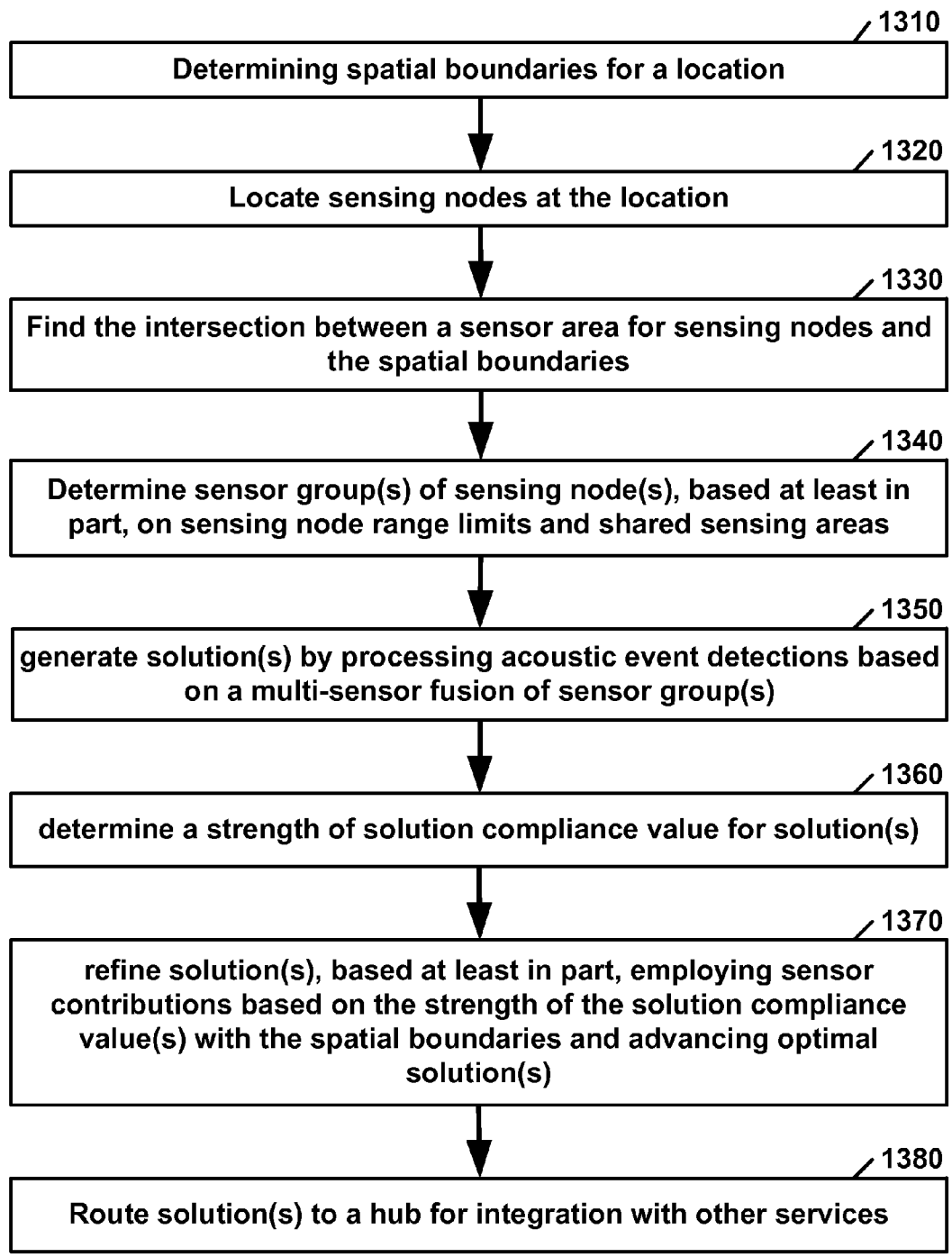
FIG. 13 is an example flow diagram showing a process of spatial limiting of sensor input according to aspects of some of the various embodiments.

FIG. 11 illustrates an example of a suitable computing system environment 1100 on which aspects of some embodiments may be implemented. The computing system environment 1100 is only one example of a suitable computing environment and is not intended to suggest any limitation as to the scope of use or functionality of the claimed subject matter. Neither should the computing environment 1100 be interpreted as having any dependency or requirement relating to any one or combination of components illustrated in the exemplary operating environment 1100.

Embodiments are operational with numerous other general purpose or special purpose computing system environments or configurations. Examples of well-known computing systems, environments, and/or configurations that may be suitable for use with various embodiments include, but are not limited to, system on module (SOM), embedded computing systems, personal computers, server computers, hand-held or laptop devices, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 11, an example system for implementing some embodiments includes a general-purpose computing device in the form of a computer 1110. Components of computer 1110 may include, but are not limited to, a processing unit 1120, a system memory 1130, and a system bus 1121 that couples various system components including the system memory to the processing unit 1120.

Computer 1110 typically includes a variety of computer readable media. Computer readable media can be any available media that can be accessed by computer 1110 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 1130 includes computer storage media in the form of volatile and/or nonvolatile memory such as ROM 1131 and RAM 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, a flash drive reader 1157 that reads flash drive 1158, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11 provide storage of computer readable instructions, data structures, program modules and other data for the computer 1110. In FIG. 11, for example, hard disk drive 1141 is illustrated as storing operating system 1144, application programs 1145, program data 1147, and other program modules 1146. Additionally, for example, non-volatile memory may include instructions to, for example, discover and configure IT device(s); the creation of device neutral user interface command(s); combinations thereof, and/or the like.

A user may enter commands and information into the computer 1110 through input devices such as a keyboard 1162, a microphone 1163, a camera 1164, and a pointing device 1161, such as a mouse, trackball or touch pad. These and other input devices are often connected to the processing unit 1120 through a peripheral input interface 1160 that is coupled to the system bus, but may be connected by other interface and bus structures, such as a parallel port, game port or a universal serial bus (USB). Additional devices may be connected to peripheral input interface 1160, such as for example, acoustic processor 1165 configured to detect bullet shockwave information. A monitor 1191 or other type of display device may also connected to the system bus 1121 via an interface, such as a video interface 1190. Other devices, such as, for example, speakers 1197 and printer 1196 may be connected to the system via peripheral interface 1195.

The computer 1110 is operated in a networked environment using logical connections to one or more remote computers, such as a remote computer 1180. The remote computer 1180 may be a personal computer, a hand-held device, a server, a router, a network PC, a peer device or other common network node, and typically includes many or all of the elements described above relative to the computer 1110. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the peripheral input interface 1160, or other appropriate mechanism. The modem 1172 may be wired or wireless. Examples of wireless devices may comprise, but are limited to: Wi-Fi and Bluetooth. In a networked environment, program modules depicted relative to the computer 1110, or portions thereof, may be stored in the remote memory storage device. By way of example, and not limitation, FIG. 11 illustrates remote application programs 1185 as residing on remote computer 1180. It will be appreciated that the network connections shown are exemplary and other means of establishing a communications link between the computers may be used. Additionally, for example, LAN 1171 and WAN 1173 may provide a network interface to communicate with other distributed infrastructure management device(s); with IT device(s); with users remotely accessing the Peripheral Input Interface 1160; combinations thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that the figures and algorithms, which highlight the functionality and advantages of the present invention, are presented for example purposes only. The architecture of the present invention is sufficiently flexible and configurable, such that it may be utilized in ways other than that shown in the accompanying figures and algorithms. For example, the steps listed in any flowchart may be re-ordered or only optionally used in some embodiments.

It should be noted the terms "including" and "comprising" should be interpreted as meaning "including, but not limited to".

In this specification, "a" and "an" and similar phrases are to be interpreted as "at least one" and "one or more." References to "the," "said," and similar phrases should be interpreted as "the at least one", "said at least one", etc. References to "an" embodiment in this disclosure are not necessarily to the same embodiment.

It is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

What is claimed is:

1. A method for locating the source of an acoustic event comprising:
   a. determining spatial boundaries for a location;
   b. locating at least two sensing nodes at the location;
   c. finding the intersection between a sensor area for each of the at least two sensing nodes and the spatial boundaries;
   d. determining at least one sensor group of the at least two sensing nodes, based at least in part, on sensing node range limits and shared sensing areas;
   e. generating at least one solution by processing acoustic event detections from sensing nodes from at least one of the at least one sensor group;
   f. determining a strength of solution compliance value for at least one of the at least one solution;
   g. refining at least one of the at least one solution, based at least in part, employing sensor contributions based on the strength of solution compliance value with the spatial boundaries and advancing optimal solutions; and
   h. routing at least one of the at least one solution to a hub for integration with other services.

2. The method according to claim 1, wherein the locating employs at least one of the following:
   a. GPS; and
   b. a relative survey technique.

3. The method according to claim 1, wherein the hub comprises at least one of the following:
   a. a communications hub;
   b. a sensor control gateway; and
   c. a data repository.

4. The method according to claim 1, wherein the location is inside a building.

5. The method according to claim 1, further comprising verifying the presence of gunfire by detection of a muzzle flash signal employing an infrared detection sensor.

6. The method according to claim 1, further comprising mounting at least one of the at least two sensor nodes on at least one of the following:
   a. a wall; and
   b. a ceiling.

7. The method of claim 1, further comprising orienting at least one of the at least two sensing nodes by rotating the at least of the at least two sensing nodes with respect to a connected mounting plate.

8. The method according to claim 1, further comprising at least one of the at least two sensor nodes managing a wireless network.

9. The method according to claim 1, further comprising at least one of the at least two sensor nodes mediating communications between two communication interfaces, based at least in part, on the requirements of the multi-sensor fusion and lighting control network requirements.

10. The method according to claim 1, further comprising at least one of the at least two sensor nodes activating upon receipt of at least one of the following actuation messages:
    a. a message configured to instruct the at least one of the at least two sensor nodes to communicate an emergency situation; and
    b. a message configured to instruct the at least one of the at least two sensor nodes to communicate a health and functional status message.

11. The method according to claim 1, further comprising at least one of the at least two sensor nodes communicating to the hub via at least one of the following:
    a. Ethernet;
    b. a wired communications port; and
    c. a wireless communications port.

12. The method according to claim 1, further comprising at least one of the at least two sensor nodes communicate to a gateway node configured to communicate to a server.

13. The method according to claim 1, further comprising delivering reports to a cloud-based data management system, the reports comprising at least one of the following:
    a. sensor detection data; and
    b. acoustic localization data.

14. The method according to claim 1, further comprising sending localization reports to an emergency alert notification system to communicate with at least one of security managers and first responders.

15. The method according to claim 1, further comprising sending localization reports to a video surveillance system configured to enable cueing of neighboring video surveillance cameras.

16. The method according to claim 1, further comprising managing and sharing detection and localization reports with at least one of applications and subscribers.

17. The method according to claim 1, further comprising communicating to the hub:
    a. the location of the acoustic source; and
    b. a reference to a camera positioned to view the location.

18. The method according to claim 1, further comprising communicating to the hub:
    a. the location of the acoustic source;
    b. a reference to a camera positioned to view the location; and
    c. the time of the acoustic event.

19. The method according to claim 1, further comprising detecting and locating, by at least one of the at least one sensor node, a calibration signal that has at least one of a characteristic and token identifier for a sensor network.

20. The method according to claim 1, wherein at least one of the at least one sensor node is integrated into an electronic target system configured to measure a position where a bullet penetrates a target plane.

21. The method according to claim 1, further comprising measuring a muzzle velocity and trajectory of a bullet at the point where a gun is fired by at least two target planes.

22. The method according to claim 1, further comprising measuring, via two microphone arrays downrange of a gunshot, a time-of-arrival and trajectory of a bullet.

* * * * *